United States Patent
Pryor et al.

(10) Patent No.: US 12,258,883 B2
(45) Date of Patent: Mar. 25, 2025

(54) CHARGE, STORAGE, AND DISCHARGE ENERGY SYSTEM USING LIQUID AIR AND sCO2

(71) Applicant: Southwest Research Institute, San Antonio, TX (US)

(72) Inventors: Owen M Pryor, San Antonio, TX (US); Aaron M Rimpel, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 17/833,653

(22) Filed: Jun. 6, 2022

(65) Prior Publication Data

US 2022/0389841 A1  Dec. 8, 2022

Related U.S. Application Data

(60) Provisional application No. 63/197,235, filed on Jun. 4, 2021.

(51) Int. Cl.

| | |
|---|---|
| F01K 23/06 | (2006.01) |
| F01K 1/04 | (2006.01) |
| F01K 7/16 | (2006.01) |
| F01K 23/10 | (2006.01) |
| F01K 25/10 | (2006.01) |
| F02C 6/04 | (2006.01) |

(Continued)

(52) U.S. Cl.
CPC .............. *F01K 23/06* (2013.01); *F01K 1/04* (2013.01); *F01K 7/16* (2013.01); *F01K 23/10* (2013.01); *F01K 25/103* (2013.01); *F02C 6/04* (2013.01); *F02C 6/14* (2013.01); *F02C 1/10* (2013.01)

(58) Field of Classification Search
CPC ........ F01K 25/10; F01K 25/103; F01K 25/06; F01K 25/08; F02C 6/14; F02C 6/16; F02C 6/18; F02C 3/22; F02C 1/08; F02C 1/10

See application file for complete search history.

(56) References Cited

U.S. PATENT DOCUMENTS

| | | | |
|---|---|---|---|
| 10,473,029 B2 * | 11/2019 | Conlon | ............... B01D 7/00 |
| 10,738,696 B2 * | 8/2020 | Conlon | .............. F25J 1/0045 |

(Continued)

FOREIGN PATENT DOCUMENTS

| | | | | |
|---|---|---|---|---|
| CN | 109812304 A | * | 5/2019 | ........... F25J 3/04836 |
| CN | 210768962 U | * | 6/2020 | ............. F01K 13/00 |
| KR | 102185002 B1 | * | 12/2020 | ............. F01K 27/02 |

*Primary Examiner* — Alain Chau
(74) *Attorney, Agent, or Firm* — Livingston Law Firm

(57) ABSTRACT

A system for using excess energy of a power generation system and an sCO2 (supercritical carbon dioxide) stream to store and generate power. An air separation unit uses the excess energy to cool and liquify ambient air into liquid nitrogen (L-N2) and liquid oxygen (L-O2). The L-O2 and L-N2 are stored until energy is desired. An L-O2 energy discharge path has an oxygen heat exchanger that vaporizes and heats the oxygen, a combustor that combusts the oxygen and fuel to produce exhaust, and a first turbine is driven by the exhaust to produce energy. An L-N2 energy discharge path has a nitrogen heat exchanger that vaporizes and heats the L-N2, thereby providing expanded nitrogen, and a second turbine is driven by the expanded nitrogen to produce energy. Heat for the heat exchangers on both discharge paths is provided by the sCO2 stream.

18 Claims, 3 Drawing Sheets

(51) Int. Cl.
*F02C 6/14* (2006.01)
*F02C 1/10* (2006.01)

(56) References Cited

U.S. PATENT DOCUMENTS

| | | | | |
|---|---|---|---|---|
| 11,149,634 B2* | 10/2021 | Callahan | ................... | F02C 3/22 |
| 2012/0151961 A1* | 6/2012 | Ha | ....................... | F25J 3/04339 |
| | | | | 62/50.3 |
| 2015/0000280 A1* | 1/2015 | Harris | .................... | F01K 25/00 |
| | | | | 60/671 |
| 2015/0184590 A1* | 7/2015 | Conlon | .................. | F25J 1/0012 |
| | | | | 60/772 |
| 2015/0300209 A1* | 10/2015 | Goldman | .................. | F01K 3/08 |
| | | | | 60/659 |
| 2015/0381025 A1* | 12/2015 | Goldman | ............... | H02K 55/00 |
| | | | | 62/45.1 |
| 2017/0022897 A1* | 1/2017 | Alekseev | ................ | F25J 1/0201 |
| 2018/0080379 A1* | 3/2018 | Conlon | ..................... | F02C 1/02 |
| 2020/0277895 A1* | 9/2020 | Callahan | .................. | F02C 6/18 |
| 2023/0417482 A1* | 12/2023 | Berra | ..................... | F25J 1/0222 |

* cited by examiner

CHARGE, STORAGE, AND DISCHARGE ENERGY SYSTEM USING LIQUID AIR AND sCO2

TECHNICAL FIELD OF THE INVENTION

This patent application relates to power generation systems, and more particularly to systems for extracting liquid oxygen and nitrogen from ambient air, storing them, and using them to produce energy.

PROVISIONAL PRIORITY DATE

This patent application claims the filing date priority of U.S. Patent Appliation No. 63/197,235, filed Jun. 4, 2021, entitled "Charge, Storage, and Discharge Energy System Using Liquid Air and sCO2".

BACKGROUND OF THE INVENTION

Renewable energy, such as wind and solar energy, has become increasingly available in the market. The power output of these energy sources is variable depending on the time of day, season, or due to other unpredictable environmental factors (e.g., cloud cover) so that it is difficult to provide a steady supply of energy throughout the year. Furthermore, total power production including renewables can exceed demand in some cases such that renewable energy production must be curtailed.

A solution to the renewable energy supply-demand mismatch problem is to store excess energy during periods of low demand. The energy can be used later when the energy from renewable sources is unavailable or peak demand is high.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a system that uses excess electrical energy to liquify and separate air into nitrogen and oxygen components (charge mode). The liquid nitrogen and liquid oxygen are stored (storage mode), and when energy is needed, used in separate power cycles to produce energy (discharge mode). An sCO2 stream is used during the discharge mode to heat the oxygen and nitrogen streams.

Thus, the invention has the three modes of an effective energy storage system: an initial energy investment to charge the system, a system to efficiently store the energy, and a system to discharge the energy to provide power.

The system is especially suitable for using excess energy of a power generation system. The excess energy can be used to liquify ambient air into liquid oxygen and liquid nitrogen. These liquified gasses can be stored and used at a later time to generate energy.

Figure 1:
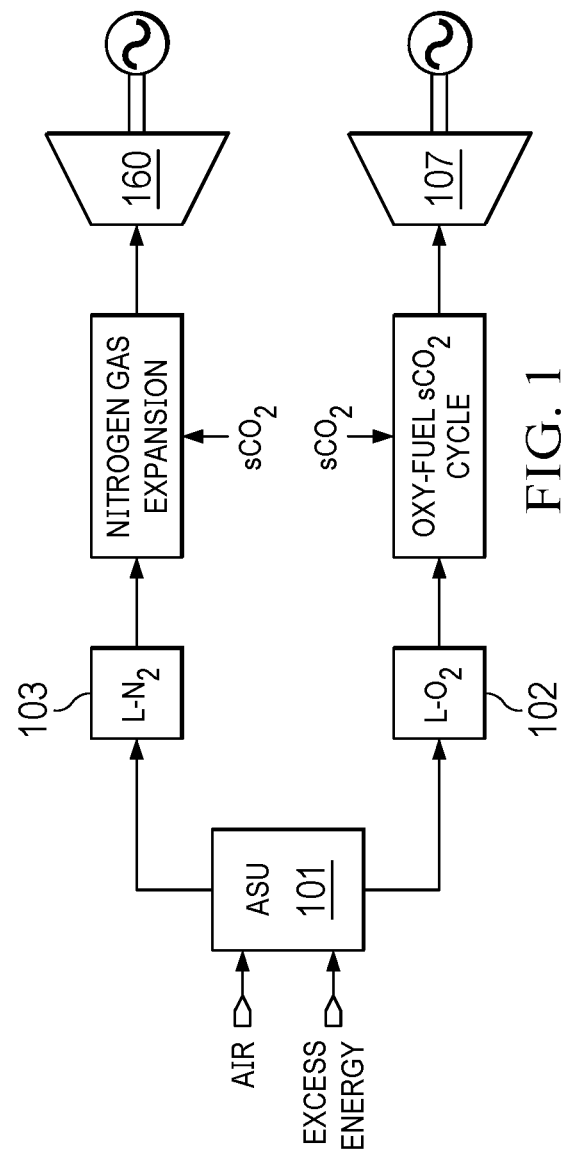
FIG. 1 illustrates a combined sCO2 (supercritical carbon dioxide) and liquid air storage and energy production system in accordance with the invention.

FIG. 1 illustrates a combined sCO2 and liquid air storage and energy production system in accordance with the invention. As explained below, the charge and discharge mode systems, as well as the storage facilities, are independent systems. The discharge mode has two paths, each path being an independent thermodynamic cycle.

During charge mode, ambient air is cooled and liquefied in an air separation unit (ASU) 101. Conventional air separation unit (ASU) technology uses electricity generated from excess renewable energy (or low-demand, low-cost electricity) to liquify and separate air into its main components of nitrogen and oxygen. Nitrogen and oxygen are separated due to their different boiling points.

The charge power rating of the ASU cycle is the product of the desired charge duration and the storage energy capacity.

The liquid nitrogen (L-N2) and liquid oxygen (L-O2) are stored in different cryogenic storage vessels 102 and 103 at their respective saturation temperatures near atmospheric pressure. These liquefied components can be safely stored in large quantities near atmospheric pressure for long periods of time.

The sizes of the L-O2 and L-N2 storage vessels 102 and 103 are determined by the energy storage capacity, which is the product of the discharge power rating and the desired discharge duration for the application.

The discharge mode has two different paths for using the liquid oxygen and liquid nitrogen to produce energy. The sizing of the discharge cycle is dictated by the desired discharge power rating.

The liquid oxygen path is an oxy-fuel sCO2 cycle. As explained below, the liquid oxygen is vaporized, then used to burn hydrocarbon fuel in a supercritical carbon dioxide (sCO2) oxy-combustor. The resulting exhaust, which is mainly CO2 and water, is used to drive turbine 107.

The liquid nitrogen path is one in which the nitrogen is vaporized using a heat exchanger, then expanded to drive turbine 160.

Figure 2:
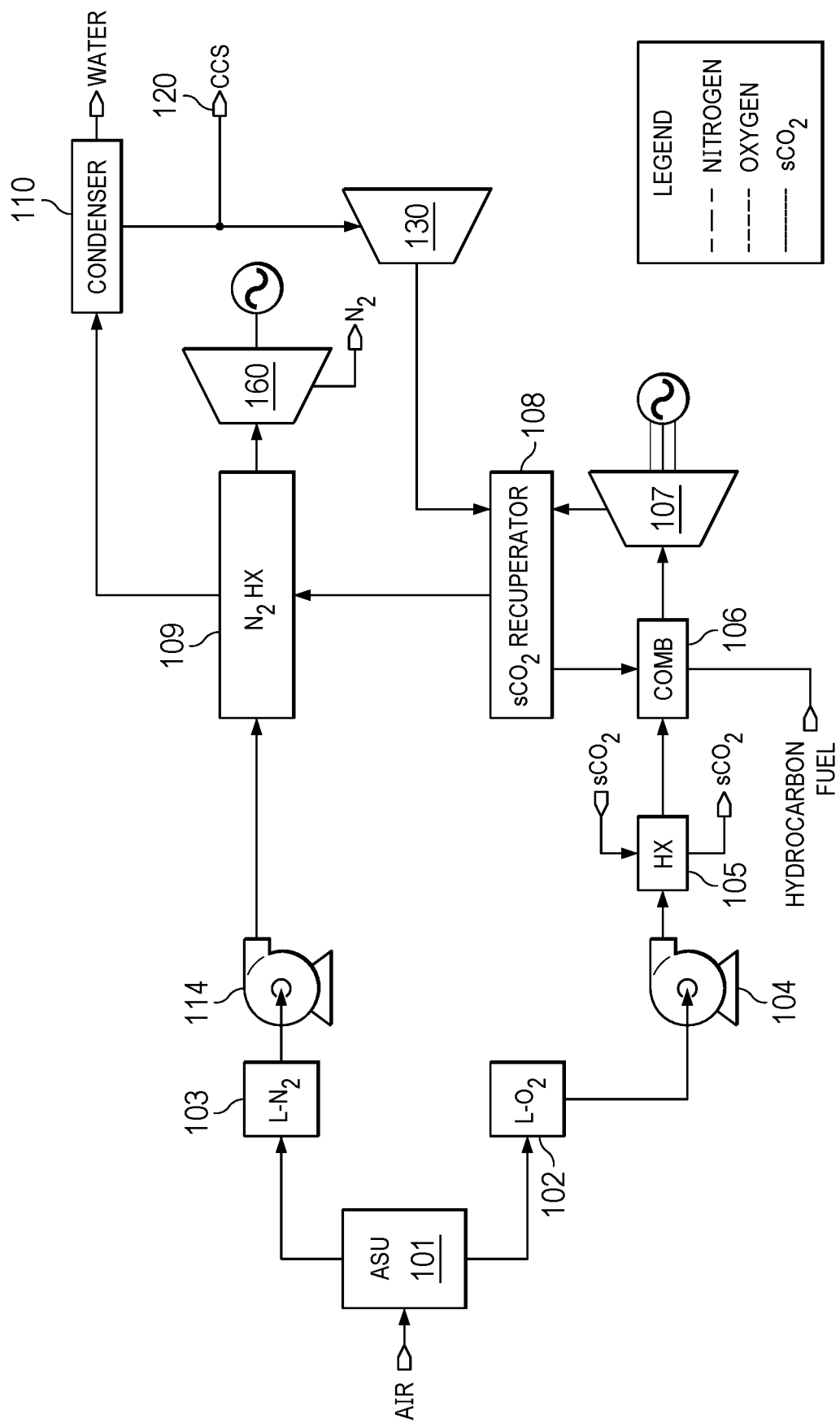
FIG. 2 illustrates the liquid oxygen and liquid nitrogen discharge paths of FIG. 1 in further detail.

FIG. 2 illustrates the liquid oxygen/sCO2 discharge path and the liquid nitrogen discharge path in further detail.

For the liquid oxygen/sCO2 discharge path, the stored liquid oxygen from storage vessel 102 is sent through a cryogenic pump 104 to increase pressure. An example of a suitable pressure is 25 or more MPa. The oxygen is then heated and vaporized by a heat exchanger 105.

The heat for heat exchanger 105 may be provided from the $sCO_2$ stream. The exit and re-entry points are not shown in FIG. 2 but may be at various locations. A suitable location for routing sCO2 to heat exchanger 105 and back again to the SCO2 stream would be upstream compressor 130. This contributes to having the sCO2 stream as cold as possible to minimize power for compression. Less power to increase sCO2 pressure results in an increase in the net power of the system.

The heated and vaporized oxygen is delivered to combustor 106 to burn with methane or other gaseous fuel. Combustor 106 is an sCO2 oxy-combustor. The combustor exhaust is then sent through turbine 107 to extract power.

After the turbine 107, the $sCO_2$ stream is passed through an sCO2 recuperator 108. The sCO2 stream is then delivered to heat exchanger 109 for heating use on the liquid nitrogen discharge path. Condenser 110 condenses water out of the sCO2 stream and the water is removed. A CCS process 120 removes CO2 created during the combustion process to maintain the mass balance. The remaining bulk flow is compressed by compressor 130 and sent back through sCO2 recuperator 108 and combustor 106 to serve as diluent during combustion.

For the liquid nitrogen discharge path, the stored liquid nitrogen from L-N2 vessel 103 is pumped to elevated pressures. A suitable pump is a cryogenic pump 114. The nitrogen is then vaporized and heated by heat exchanger 109, which uses heat from the sCO2 stream. The nitrogen is then expanded in a turbine 160 to generate power.

Figure 3:
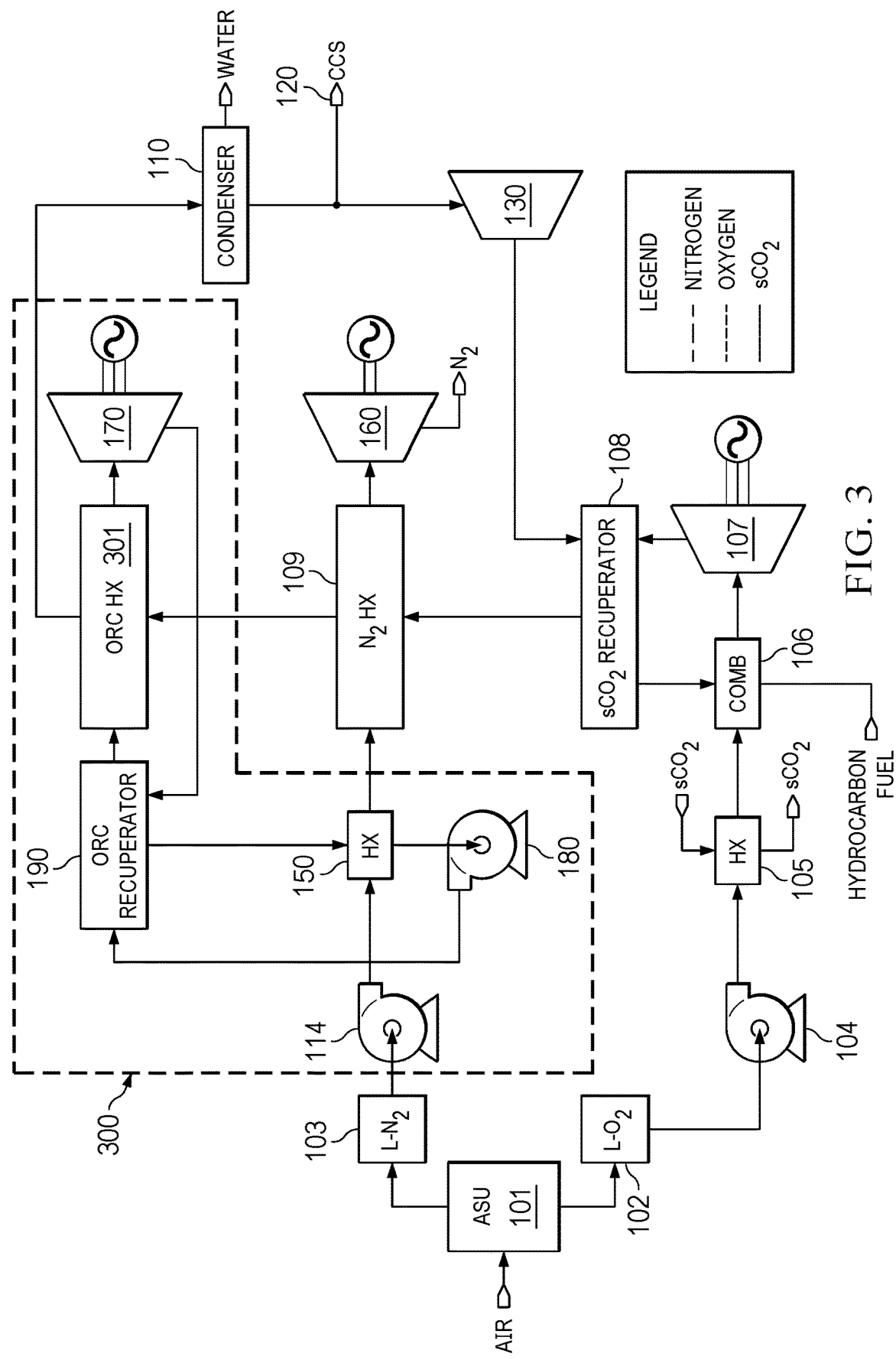
FIG. 3 illustrates the system of FIGS. 1 and 2 with an additional organic Rankine cycle (ORC) cycle as a third energy source.

FIG. 3 illustrates the system of FIGS. 1 and 2 with an organic Rankine cycle (ORC) bottoming cycle 300 that provides a third power generation source. This ORC bottoming cycle 300 is a thermodynamic cycle that generates power from heat of the sCO2 stream.

As stated above, on the L-N2 discharge path, an sCO2 stream is used to heat the liquid nitrogen in heat exchanger 109. After heat exchanger 109, the sCO2 stream is used in an ORC heat exchanger 301.

Power is produced by expanding the ORC stream through turbine 170. To enhance efficiency, the ORC stream uses a pump 180 to elevate pressure and a recuperator 190 to receive the ORC stream back from turbine 170. The ORC stream may be further used for a heat exchanger 150 on the nitrogen discharge path upstream nitrogen heat exchanger 109.

As indicated above, a feature of the invention is the use of sCO2 for both heat exchanger 105 and heat exchanger 109. The sCO2 produced by combustor 106 follows a path that allows it to be recuperated, water removed, compressed, and returned to the combustor. Thus, the sCO2 is generated, circulated, and re-used within the L-02 and L-N2 discharge paths.

What is claimed is:

1. A method of using excess electrical energy of a primary power generation system to store and generate power, comprising:
   using an air separation unit powered by the excess electrical energy to cool and liquify ambient air into liquid nitrogen and liquid oxygen;
   storing the liquid oxygen and liquid nitrogen in separate storage systems;
   using the liquid oxygen (L-O2) in an L-O2 energy discharge path that vaporizes and heats the oxygen with an L-O2 heat exchanger, receives the oxygen into an sCO2 oxy-combustor that provides an sCO2 (supercritical carbon dioxide) stream, and uses exhaust from the combustor to drive a first turbine;
   using a recuperator to recover waste heat from the first turbine thereby capturing the sCO2 stream;
   wherein the oxygen is vaporized and heated with heat from the sCO2 stream delivered to the L-O2 heat exchanger; and
   using the liquid nitrogen (L-N2) in an L-N2 energy discharge path that vaporizes and heats the nitrogen with an L-N2 heat exchanger, thereby providing expanded nitrogen, and uses the expanded nitrogen to drive a second turbine;
   wherein the L-N2 heat exchanger uses heat from the sCO2 stream delivered from the recuperator, such that the recuperator is configured to deliver heat from the sCO2 stream to the L-N2 heat exchanger while both the L-O2 energy discharge path and the L-N2 energy discharge path are in operation;
   wherein the air separation unit operates independently of both the L-02 energy discharge path and the L-N2 energy discharge path;
   wherein both the L-02 energy discharge path and the L-N2 energy discharge path operate independently of operation of the primary power generation system.

2. The method of claim 1, further comprising using an organic Rankine cycle (ORC) to drive a third turbine, the working fluid of the ORC being heated by sCO2 exiting the LN-2 heat exchanger.

3. The method of claim 1, wherein the sCO2 stream follows an sCO2 path having the recuperator and compressor that receives the sCO2 stream downstream the L-N2 heat exchanger and delivers compressed sCO2 back to the recuperator, and wherein the recuperator delivers dilute sCO2 to the sCO2 oxy-combustor.

4. The method of claim 3, wherein the sCO2 path further has a condenser between the L-N2 heat exchanger and the compressor, operable to remove water from the sCO2 stream.

5. The method of claim 3, wherein the sCO2 stream delivered to the L-02 heat exchanger originates from upstream the compressor.

6. The method of claim 3, wherein the sCO2 stream delivered to the L-02 heat exchanger originates from a point between L-N2 heat exchanger and the compressor.

7. The method of claim 3, wherein the L-02 heat exchanger delivers a cooled sCO2 stream to a point upstream the compressor.

8. The method of claim 3, wherein the L-02 heat exchanger delivers a cooled sCO2 stream to a point between the L-N2 heat exchanger and the compressor.

9. The method of claim 1, wherein the primary power generation system is a renewable energy system.

10. A system for using excess electrical energy of a primary power generation system to store and generate power, comprising:
    an air separation unit operable to use the excess electrical energy to cool and liquify ambient air into liquid nitrogen (L-N2) and liquid oxygen (L-O2);
    an L-O2 storage vessel for storing the liquid oxygen;
    an L-N2 storage vessel for storing the liquid nitrogen;
    an L-O2 energy discharge path having an L-O2 heat exchanger that vaporizes and heats the oxygen, an sCO2 oxy-combustor that combusts the oxygen and a fuel to produce an sCO2 (supercritical carbon dioxide) stream, and a first turbine driven by exhaust from the sCO2 oxy-combustor;
    a recuperator that recovers waste heat from the first turbine, thereby capturing the sCO2 stream;
    wherein the L-O2 heat exchanger vaporizes and heats the L-O2 using heat from the sCO2 stream; and
    an L-N2 energy discharge path having an L-N2 heat exchanger that vaporizes and heats the L-N2, thereby providing expanded nitrogen, and a second turbine driven by the expanded nitrogen;
    wherein the L-N2 heat exchanger uses the sCO2 stream delivered from the recuperator, such that the recuperator is configured to deliver the sCO2 stream to the L-N2 heat exchanger while both the L-02 energy discharge path and the L-N2 energy discharge path are in operation;
    wherein the air separation unit operates independently of both the L-02 energy discharge path and the L-N2 energy discharge path;

wherein both the L-O2 energy discharge path and the L-N2 energy discharge path operate independently of operation of the primary power generation system.

11. The system of claim 10, further comprising an organic Rankine cycle (ORC) that drives a third turbine, the working fluid of the ORC being heated by sCO2 exiting the L-N2 heat exchanger.

12. The system of claim 10, wherein the sCO2 stream follows an sCO2 path having the recuperator, and a compressor that receives the sCO2 stream downstream of the L-N2 heat exchanger and delivers compressed sCO2 back to the recuperator.

13. The system of claim 12, wherein the sCO2 path further has a condenser between the L-N2 heat exchanger and the compressor, operable to remove water from the sCO2 stream.

14. The system of claim 12, wherein the sCO2 stream delivered to the L-O2 heat exchanger originates from upstream the compressor.

15. The system of claim 12, wherein the sCO2 stream delivered to the L-O2 heat exchanger originates from a point between the L-N2 heat exchanger and the compressor.

16. The system of claim 12, wherein the LO2 heat exchanger delivers cooled sCO2 to a point upstream the compressor.

17. The system of claim 12, wherein the L-O2 heat exchanger delivers cooled sCO2 to a point between the L-N2 heat exchanger and the compressor.

18. The system of claim 12, wherein the primary power generation system is a renewable energy system.

* * * * *